United States Patent [19]

Yamanaka et al.

[11] Patent Number: 5,682,366
[45] Date of Patent: Oct. 28, 1997

[54] OPTICAL DISC RECORDING APPARATUS WITH EFFICIENT DATA CHECKING

[75] Inventors: Yoshihiro Yamanaka, Kanagawa; Jun Saito, Tokyo; Shinichi Kurita, Kanagawa, all of Japan

[73] Assignee: Nikon Corporation, Tokyo, Japan

[21] Appl. No.: 433,370

[22] PCT Filed: Oct. 6, 1994

[86] PCT No.: PCT/JP94/01670

§ 371 Date: May 4, 1995

§ 102(e) Date: May 4, 1995

[87] PCT Pub. No.: WO95/10111

PCT Pub. Date: Apr. 13, 1995

[30] Foreign Application Priority Data

Oct. 6, 1993  [JP]  Japan ..................... 5-250735

[51] Int. Cl.⁶ ............................................. G11B 7/00
[52] U.S. Cl. ......................... 369/54; 369/13; 369/44.31
[58] Field of Search ............................. 369/44.31, 44.32, 369/44.33, 13, 116, 54, 58

[56] References Cited

U.S. PATENT DOCUMENTS

| | | | |
|---|---|---|---|
| 4,554,654 | 11/1985 | Kato | 369/58 X |
| 4,648,058 | 3/1987 | Shimonou | 369/54 |
| 4,807,210 | 2/1989 | Kaku et al. | 369/44.31 X |
| 4,982,389 | 1/1991 | Nakao et al. | 369/116 X |
| 4,985,880 | 1/1991 | Yoshida et al. | 369/13 |
| 5,224,085 | 6/1993 | Shinkai et al. | 369/44.33 |
| 5,341,359 | 8/1994 | Birukawa et al. | 369/13 X |
| 5,428,586 | 6/1995 | Kobayashi et al. | 369/13 |

FOREIGN PATENT DOCUMENTS

| | | |
|---|---|---|
| 60-59540 | 4/1985 | Japan . |
| 61-158079 | 7/1986 | Japan . |
| 61-283079 | 12/1986 | Japan . |
| 61-292227 | 12/1986 | Japan . |
| 62-20140 | 1/1987 | Japan . |
| 62-8376 | 1/1987 | Japan . |
| 63-18545 | 1/1988 | Japan . |
| 63-206965 | 8/1988 | Japan . |
| 63-181157 | 11/1988 | Japan . |
| 63-316371 | 12/1988 | Japan . |
| 3-22222 | 1/1991 | Japan . |
| 3-86955 | 4/1991 | Japan . |
| 4-105824 | 9/1992 | Japan . |
| 5-89554 | 4/1993 | Japan . |
| 5-89608 | 4/1993 | Japan . |
| 5-250675 | 9/1993 | Japan . |

*Primary Examiner*—Thang V. Tran
*Attorney, Agent, or Firm*—Keck, Mahin & Cate

[57] ABSTRACT

An optical disc recording apparatus which requires no additional head optical system and is capable of reducing the time required for a data checking operation. By detecting any irregularity of a signal in accordance with reflected light from an optical disc during the recording of the signal, it is determined whether the signal has been recorded correctly on the optical disc during the signal recording.

4 Claims, 4 Drawing Sheets

1

OPTICAL DISC RECORDING APPARATUS WITH EFFICIENT DATA CHECKING

TECHNICAL FIELD

The present invention relates to an apparatus for recording signals on an optical disc.

BACKGROUND ART

In the past, it has been the practice with the optical disc recording apparatus so that when signals are recorded on an optical disc, the operation of confirming whether the written signals can be correctly read out is performed for the purpose of enhancing the reliability of the signals recorded on the optical disc.

The most common one of the known methods is a method known as the RAW (read after write) check. According to this method, after the recording of a signal on a certain data region of an optical disc or immediately after the recording, the operation of reproducing the recorded signal is performed so as to check the reproduced data and thereby to check whether the signal has been recorded correctly.

FIG. 6 is a block diagram showing the construction of a conventional device for performing the RAW check. In FIG. 6, the laser beam emitted from a head 622 is first projected on an optical disc 621 and the reflected light from it is received by the photodetector in the head 622. The resulting output signal from the photodetector is outputted as binary coded data through a reproducing circuit 623 and a binarization circuit 624. In this way, the signal recorded on the optical disc 621 is read out in the form of binary coded data. This binary coded data is converted into parallel data by a serial/parallel converter 625 and the data read out is subjected to error correction by an ECC decoder circuit 626 thereby confirming whether the recorded signal can be reproduced as the correct data.

Also, it has been known in the past that the frequency band of an amplifier utilized for the detection of a servo signal for the servo control is sufficient if it is on the order of several KHz.

The servo control is "a control system so constructed that a controlled system follows up arbitrary changes of a desired value" and generally the focusing control of the optical disc apparatus is such that a disc surface position is the desired value and the focal point of a laser beam is caused to follow up this surface position. Also, in the case of the tracking control the desired value is the central position of a data recording portion on the optical disc and a laser beam is projected on this surface position thus causing the center of the resulting light spot to follow up the surface position. A control element is mainly composed of an electric system so that the difference between the desired value and the controlled system or the current position is converted into an electric difference signal and the signal is sent to the controlled system in the feedback system so as to reduce the difference to zero.

Further, the servo controls employed by the optical disc recording and reproducing apparatus include for example a head movement control for moving the signal read/write head to the desired position, a focusing control for positioning the focal point of light entering into and emerging from the head to a signal recording portion of the disc and a tracking control for causing the focal point of the light to follow a track on the disc and the signals used for these controls are servo signals.

With the above-mentioned conventional techniques, however, the reproducing operation for the data checking of the written signals is performed after the writing operation during the signal recording and therefore a long time is required as compared with the recording operation without the RAW check. While it is conceivable to add a separate head which performs a reproducing operation for data checking purpose to overcome the problem of time consumption, there is the disadvantage of requiring an additional head optical system.

DISCLOSURE OF INVENTION

It is an object of the present invention to provide an optical disc recording apparatus which requires no additional head optical system and capable of reducing the time required for a data checking operation.

To accomplish the above object, an optical disc recording apparatus according to a preferred aspect of the present invention includes:

signal recording means for recording a signal on an optical disc by the projection of a laser beam, a reflected light signal detecting circuit for generating a reflected light signal by receiving the reflected light from the optical disc during the recording of a signal, and a decision circuit for detecting an irregularity of the reflected light signal to determine whether the signal has been normally recorded on the optical disc.

It is preferable that the frequency band of the reflected light signal detecting circuit is lower than the signal recording frequency.

An optical disc recording apparatus according to another preferred aspect of the present invention includes:

a head for recording a signal on an optical disc by projecting a laser beam on the optical disc while subjecting the laser beam to intensity modulation, a photodetector for receiving the reflected light of the laser beam from the optical disc to convert the same into an electric signal, a signal detecting circuit for receiving the signal from the photodetector to generate a reflected light signal, and an anomaly decision circuit for receiving the reflected light signal to detect an anomaly of the reflected light signal and thereby to determine whether the signal has been recorded normally on the optical disc.

The frequency band of the signal detecting circuit should preferably be lower than the intensity modulating frequency of the laser beam.

An optical disc recording apparatus according to still another preferred aspect of the present invention includes:

a head for recording a signal on an optical disc by projecting a laser beam on the optical disc while subjecting the laser beam to intensity modulation, a photodetector for receiving the reflected light of the laser beam from the optical disc to convert the reflected light into an electric signal, a servo signal detecting circuit for receiving the signal from the photodetector to generate a servo signal for an auto focusing control, and an anomaly decision circuit for receiving the servo signal to detect an anomaly of the reflected light signal and thereby to determine whether the signal has been recorded normally on the optical disc.

An optical disc recording apparatus according to still another preferred aspect of the present invention includes:

a head for recording a signal on an optical disc by projecting a laser beam on the optical disc while intensity modulating the laser beam in accordance with the recording signal, a photodetector for receiving the reflected light of the laser beam from the optical disc to convert it into an electric signal, a signal detecting circuit for receiving the signal from the photodetector to generate a reflected light signal, a comparison circuit for receiving the reflected light signal and the recording signal to compare the signals, and an anomaly decision circuit responsive to an output from the comparison circuit to determine whether the signal has been normally recorded on the optical disc.

An optical disc recording apparatus according to still another preferred aspect of the present invention includes:

signal recording means for recording a signal on a magneto-optical disc having a GdFeCo reproducing layer and capable of direct overwriting by projecting a laser beam on the disc, a Kerr effect detector for detecting a Kerr effect of the reflected light from the optical disc during the signal recording, and a decision circuit responsive to an output from the Kerr effect detector to determine whether the signal has been normally recorded on the optical disc.

An optical disc recording apparatus according to still another preferred aspect of the present invention includes:

a head for recording a signal on a magneto-optical disc having a GdFeCo reproducing layer and capable of direct overwriting by projecting a laser beam on the disc, a Kerr effect detector for detecting a Kerr effect of the reflected light from the optical disc during the signal recording, a photodetector for receiving the reflected light of the laser beam from the optical disc to convert it into an electric signal, a signal detecting circuit for receiving the signal from the photodetector to generate a reflected light signal, and a decision circuit responsive to an output from the Kerr effect detector and the reflected light signal to determine whether the signal has been normally recorded on the optical disc.

Thus, the optical disc recording apparatus according to the present invention is designed so that by detecting an irregularity of a signal according to the reflected light from an optical disc during the recording of the signal, it is determined whether the signal has been normally recorded on the optical disc during the signal recording.

BEST MODE FOR CARRYING OUT THE INVENTION

Figure 1:
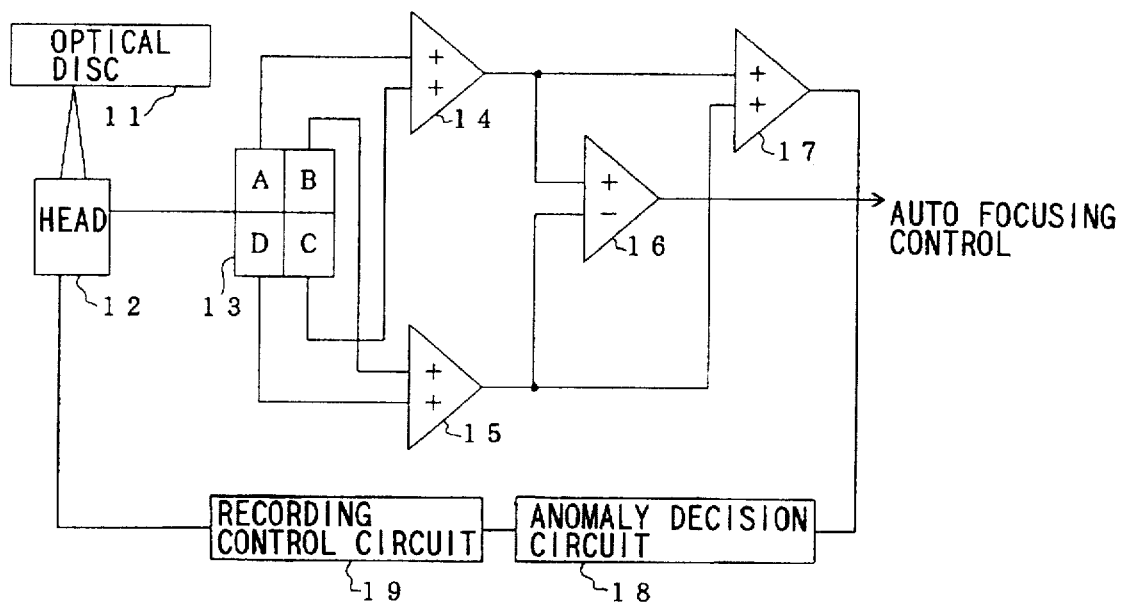
FIG. 1 is a block diagram showing the construction of an optical disc recording apparatus according to a first embodiment of the present invention.

FIG. 1 is a block diagram showing the construction of an optical disc recording apparatus according to a first embodiment of the present invention. It is to be noted that in all the below-mentioned embodiments including the present embodiment the optical disc used has a diameter of 130 mm, a disc rotational speed of 1800 rpm and a record/reproduce laser beam wavelength of 830 nm and the recording of a signal on a track at the position of a disc radius R=45 mm is effected after the whole surface of the optical disc has been initialized.

The recording of a signal on an optical disc 11 is effected by projecting the laser beam emitted from a head 12 on the recording surface of the optical disc 11. The intensity of the laser beam is modulated in accordance with the data in the signal to be recorded. The frequency (recording frequency) of the signal (recording signal) indicating the data to be recorded is generally in the range of 5 to 10 MHz.

During the time that the signal is recorded on the optical disc 11, the reflected light of the laser beam from the disc surface is entered into a quadsplit PD (photodetector) 13 through the head 12. As shown in the Figure, the quadsplit PD 13 is composed of four sensor portions A, B, C and D and each of the sensor portions converts the incident light into an electric signal of a level corresponding to its light intensity to output the signal. Each of the electric signals generated from the quadsplit PD 13 is applied to a summing amplifier 14 or 15. The signal (A+D) from the summing amplifier 14 is applied to one input terminal (+) of a servo signal detecting amplifier 16 and one input terminal of a total reflected light signal detecting amplifier 17. Also, the signal (B+C) from the summing amplifier 15 is applied to the other input terminal (−) of the servo signal detecting amplifier 16 and the other input terminal of the total reflected light signal detecting amplifier 17.

An amplifier having a frequency band of 5 to 10 KHz is used as the servo signal detecting amplifier 16. For instance, if an amplifier having a frequency band of 5 KHz is used, signals of 5 KHz or less can be detected. Similarly, an amplifier having a frequency band of 2 to 3 MHz is used as the total reflected light signal detecting amplifier 17. For instance, if an amplifier having a frequency band of 2 MHz is used, signals of 2 MHz or less can be detected.

The signal detected by the servo signal detecting amplifier 16 and having a frequency lower than the frequency band of 5 to 10 KHz is used for an auto focusing control and an auto tracking control. The signal detected by the total reflected light signal detecting amplifier 17 and having a frequency lower than 2 to 3 MHz is applied to an anomaly decision circuit 18.

In accordance with the signal from the total reflected light signal detecting amplifier 17, the anomaly decision circuit 18 determines whether the signal has been recorded correctly on the optical disc 11. As mentioned previously, generally the recording frequency used for recording signals on the optical disc is in the range of 5 to 10 MHz. If the frequency band of the total reflected light signal detecting amplifier 17 is selected lower than the recording frequency, no signals of 5 to 10 MHz are generated from the total reflected light signal detecting amplifier 17 so far as the recording has been effected normally. Therefore, when a signal of a frequency lower than 2 to 3 MHz is detected from the total reflected light signal detecting amplifier 17, it is considered that the total reflected light signal is irregular. At this time, the anomaly decision circuit 18 determines that the recording has not been effected normally and an output signal of the corresponding content is generated.

The signal indicating the result of the decision by the anomaly decision circuit 18 is applied to a recording control circuit 19. When it is decided that there has been an anomaly during the recording, the recording control circuit 19 controls a reperformance of the recording operation on the optical disc 11. For instance, the operation of the head 12 is controlled so that the projection position of the laser beam on the optical disc 11 is moved to the position required for reperformance of the recording operation and the signal to be recorded is again sent to the head 12.

With the frequency band of the total reflected light signal detecting amplifier 17 set to 2 MHz, the presence of irregularity in the total reflected light signal was actually checked during the signal recording thus detecting the portion in which the signal was not recorded correctly.

Thus, by detecting the presence of irregularity in the total reflected light signal during the signal recording, there is no need to perform the reproduction required for checking the recorded signal after the signal has been recorded or immediately after the recording of the signal.

Figure 2:
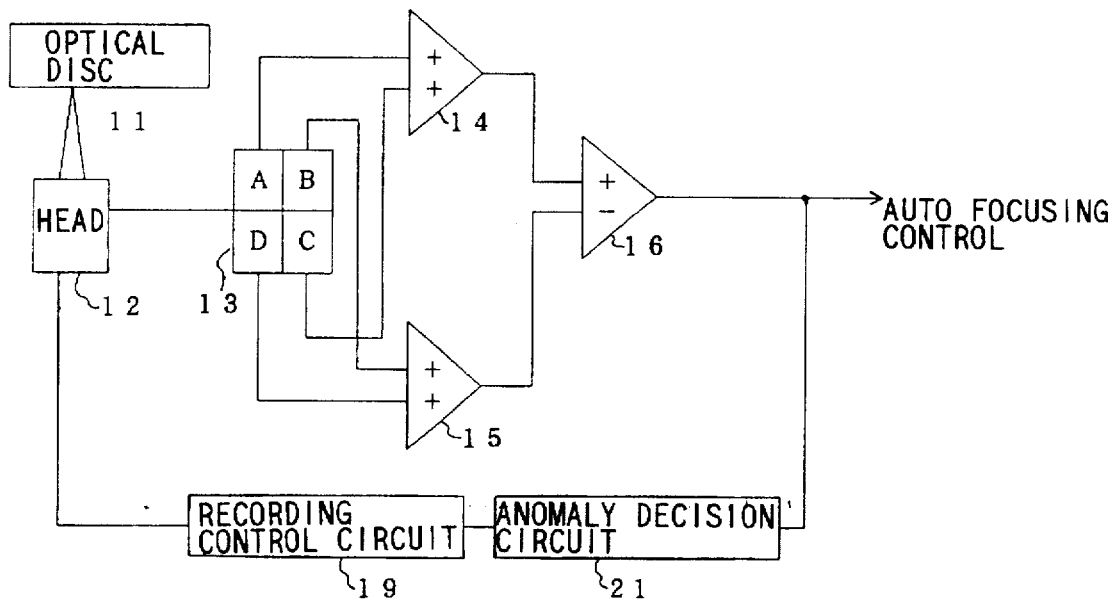
FIG. 2 is a block diagram showing the construction of an optical disc recording apparatus according to a second embodiment of the present invention.

FIG. 2 is a block diagram showing the construction of an optical disc apparatus according to a second embodiment of the present invention. In FIG. 2, the signal having a frequency lower than 5 to 10 KHz and detected by a servo signal detecting amplifier 16 is used for an auto focusing control and it is also applied to an anomaly decision circuit 21. The anomaly decision circuit 21 detects a signal of a frequency lower than 5 to 10 KHz. A low-pass filter may for example be used for such anomaly decision circuit.

When the auto focusing servo is functioning normally, practically no signal is generated from the servo signal detecting amplifier 16. On the other hand, when the focusing servo is not functioning normally or when there is any defect on an optical disc 11, a signal having a certain level is generated from the servo signal detecting amplifier 16. Also, when such signal is generated, a detection signal is also generated from the anomaly decision circuit 21. Since it is considered that the recording has not been effected normally if the focusing servo is not functioning normally or if there is any defect on the optical disc 11, a recording control circuit 19 controls a reperformance of the recording operation on the optical disc 11 in accordance with the detection signal from the anomaly decision circuit 21 in the like manner as the first embodiment.

The frequency band of the anomaly decision circuit 21 is sufficient if it is equivalent to the frequency band of the servo signal detecting amplifier 16 and it need not be higher than the frequency band of the servo signal detecting amplifier 16.

In the present embodiment, the frequency of a signal to be detected by the anomaly decision circuit 21 is lower than 5 to 10 KHz. On the other hand, the recording frequency of the signal is between 5 and 10 MHz. Thus, in the case of a very short-time recording operation which records a signal for a short data on the optical disc 11, there are cases where it is impossible to detect an anomaly even if there is any. The anomaly detection of the present embodiment is suited for detecting the occurrence of anomaly over a relatively wide area on the disc 11 when recording a signal for a long continuous data on the disc 11.

In addition, the amplifier for generating a focusing error signal in the conventional apparatus may be used for the servo signal detecting amplifier 16 of the present embodiment. By adding the anomaly decision circuit 21 to the output side of this amplifier, it is possible to realize the apparatus of the present embodiment.

Figure 3:
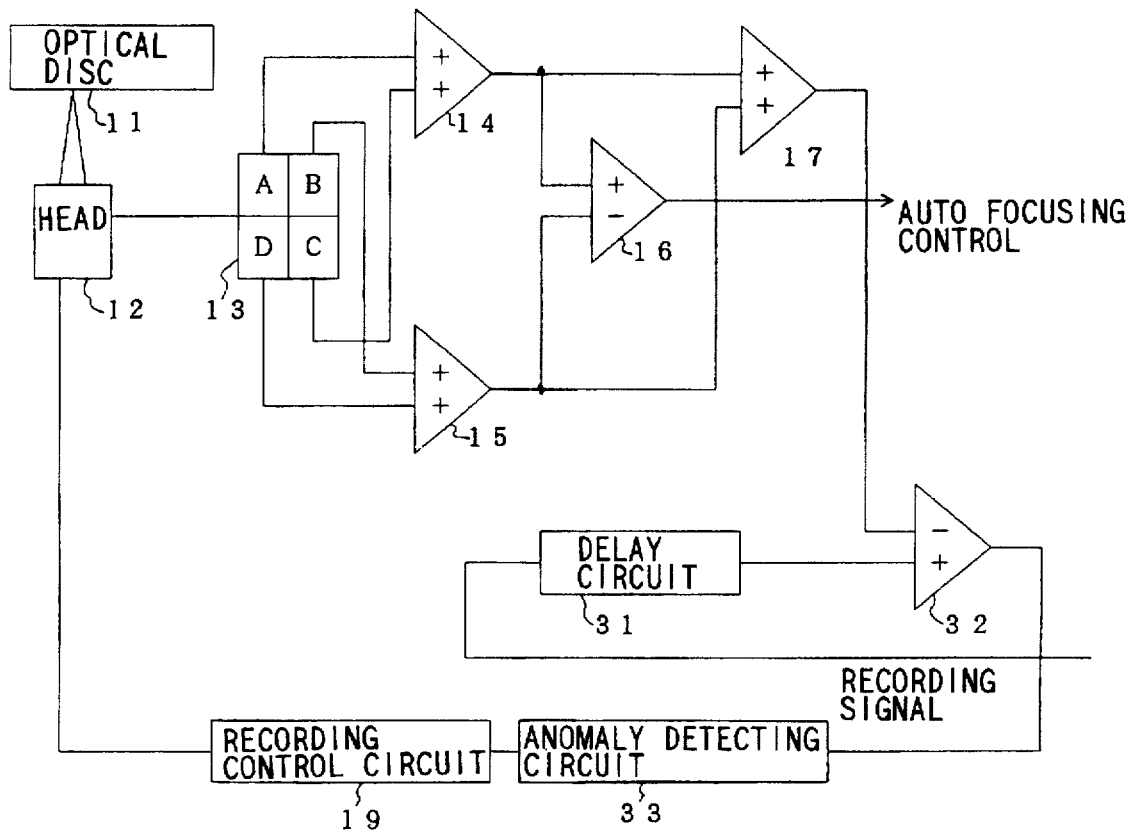
FIG. 3 is a block diagram showing the construction of an optical disc recording apparatus according to a third embodiment of the present invention.

FIG. 3 is a block diagram showing the construction of an optical disc apparatus according to a third embodiment of the present invention. In the third embodiment, the frequency band of a total reflected light signal detecting amplifier 17 is 10 MHz.

Then, when recording a signal on an optical disc 11 as mentioned previously, a laser beam is intensity modulated by the recording frequency of the signal. In other words, the laser beam is turned on and off at the recording frequency. If the frequency band of the total reflected light signal detecting amplifier 17 is increased excessively, variations in the total reflected light signal due to the turning on and off of the laser beam will also be detected.

Thus, the present embodiment includes a delay circuit 31 for delaying the recording signal (the signal indicative of the data to be recorded) a predetermined time. The delay time by the delay circuit is set so as to correspond to the time interval between the generation of the recording signal and the generation of a total reflected light quantity signal corresponding to the recording signal.

The recording signal passed through the delay circuit 31 is applied to one input terminal (+) of a differential amplifier 32. The total reflected light signal from the total reflected light signal detecting amplifier 17 is applied to the other input terminal (−) of the differential amplifier 32. In other words, the recording signal and the total reflected light signal are applied in coincidence with each other in timing to the differential amplifier 32 and the differential amplifier 32 generates the difference signal of the two input signals.

FIGS. 4a to 4d are signal waveform diagrams showing the relation between the recording signal, the total reflected light signal and the output signal of the differential amplifier 32 in the third embodiment.

Figure 4:
FIG. 4a, 4b, 4c and 4d are signal waveform diagrams showing the relation between the recording signal, the total reflected light signal and the output signal from the differential amplifier in the optical disc recording apparatus according to the third embodiment of the present invention.
Figure 4:
Figure 4:
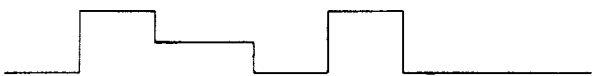
Figure 4:
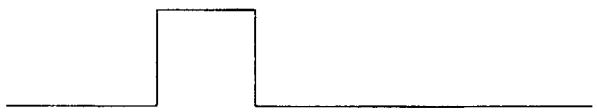

FIG. 4a shows an example of the waveform of the recording signal (the output signal from the delay circuit 31), and the output signal from the delay circuit 31 and the total reflected light signal from the total reflected light signal detecting amplifier 17 are the same in waveform when the data has been normally recorded on the disc 11. As a result, the output signal from the differential amplifier 32 shows a zero output state as shown in FIG. 4b.

FIG. 4c shows an example of the waveform of the total reflected light signal from the total reflected light signal detecting amplifier 17 under the anomalous condition.

When the recording of the signal is anomalous in this way, a signal of the waveform (FIG. 4d) corresponding to the difference between the waveform (FIG. 4c) of the total reflected light signal and the waveform (FIG. 4a) of the recording signal from the delay circuit 31 is generated from the differential amplifier 32. The signal of the waveform shown in FIG. 4d is applied to an anomaly decision circuit 33 so that it is compared with a predetermined threshold value and it is determined as the result of this discrimination operation of the anomaly decision circuit 33 that the recording on the disc 31 has not been effected normally. When the anomaly decision circuit 33 generates an output representing the occurrence of the anomaly, a recording control circuit 19 receives the output and it controls the reperformance of the recording operation as mentioned previously.

Figure 5:
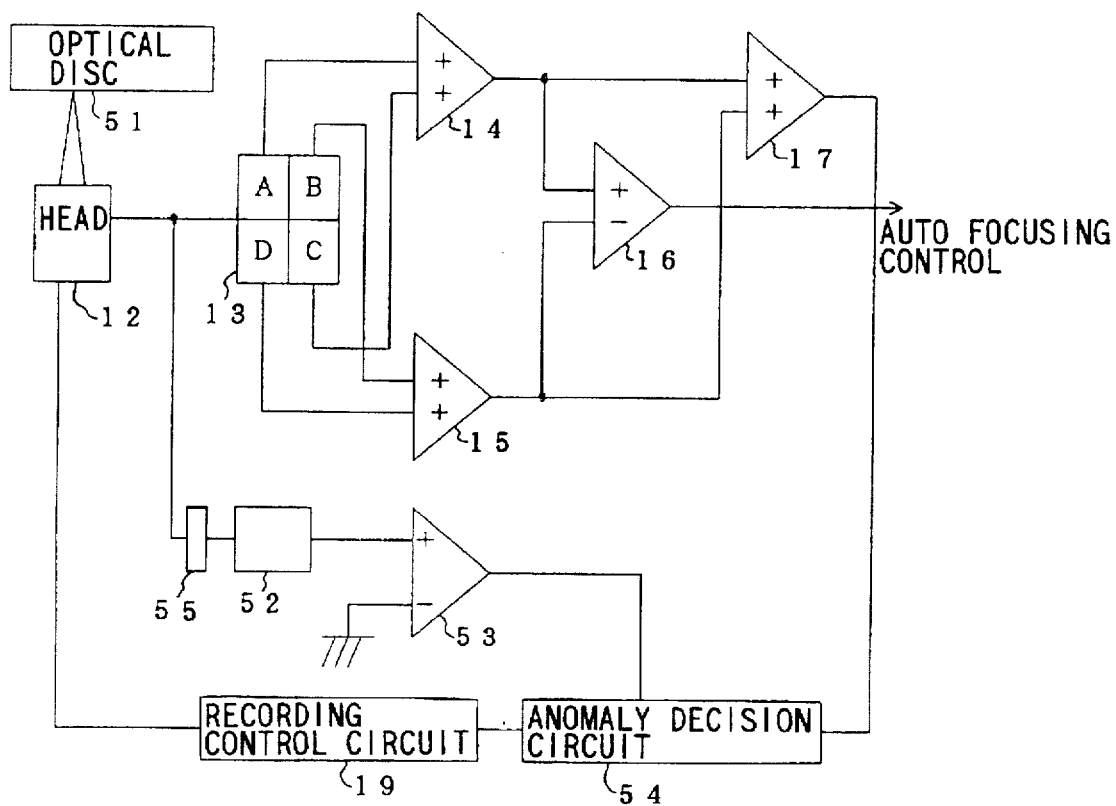
FIG. 5 is a block diagram showing the construction of an optical disc recording apparatus according to a fourth embodiment of the present invention.
Figure 6:
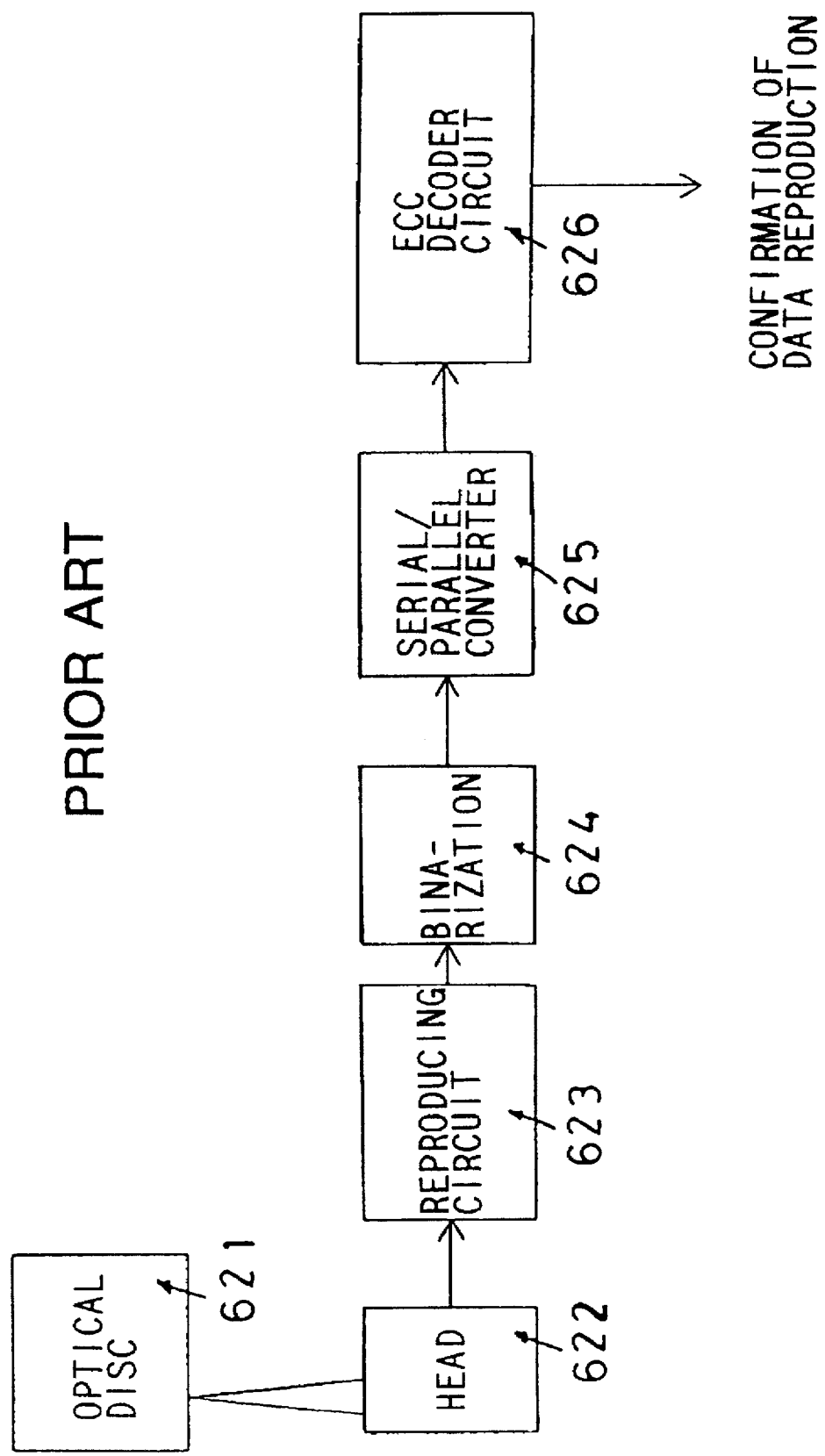
FIG. 6 is a block diagram showing the construction of a conventional apparatus for performing the RAW check.

FIG. 5 is a block diagram showing the construction of an optical disc apparatus according to a fourth embodiment of the present invention. In FIG. 5, a disc 51 is a magneto-optical disc having a GdFeCo reproducing layer and capable of direct overwriting. The description on the magneto-optical disc having a GdFeCo reproducing layer and capable of direct overwriting is included on pages 65 to 72 of The Institute of Electronics, Information and Communication Engineers "Technical Report of IEICE" MR 92–94 (1993-3).

Generally, in the magneto-optical disc having a GdFeCo reproducing layer and capable of overwriting the curie point temperature of the GdFeCo reproducing layer is set higher than the curie point temperature of the memory layer due to the composition of the reproducing layer. The recording signal assumes two kinds of values according to the directions of magnetization of the recording layer so that the directions of magnetization of the recording layer are first transferred to the memory layer and then are transferred to the GdFeCo reproducing layer, thereby effecting the recording.

The directions of magnetization of the GdFeCo reproducing layer are in conformity with the directions of magnetization of the memory layer within the range from the room temperature to near the curie point temperature. When the laser beam is projected on the magneto-optical disc 51, the memory layer reaches the curie point temperature so that the directions of magnetization are transferred to it from the recording layer and immediately thereafter the directions of magnetization are transferred to the GdFeCo reproducing layer.

At this time, the Kerr effect can be detected by the reflected light from the magneto-optical disc 51. If the Kerr effect cannot be detected, it can be determined that the signal has not been recorded normally on the optical disc 51.

During the time that the signal is recorded on the magneto-optical disc 51, the reflected light from the optical disc 51 is entered into a quadsplit PD 13 through a head 12. The flow of the signals from the quadsplit PD 13 up to a servo signal detecting amplifier 16 and a total reflected light quantity signal detecting amplifier 17 is the same as in the case of the first embodiment. Further, the reflected light from the head 12 is also entered into a PD 52 through a light-sensitive element 55.

The light-sensitive element 55 is an optical member which passes only light of a predetermined polarizing direction. In the present embodiment, it is only necessary to design so that the light-sensitive element 55 passes only light of a polarizing direction when the reflected light has not been subjected to the Kerr effect. If it is so designed, when the reflected light is subjected to the Kerr effect, the polarizing direction is changed and thus the reflected light cannot be passed through the light-sensitive element 55. As a result, the reflected light is not entered into the PD 52 and no signal is generated from the PD 52, thereby causing a Kerr effect detecting amplifier 53 to generate no signal.

On the other hand, when the reflected light is not subjected to the Kerr effect, the reflected light is passed through the light-sensitive element 55. The light passed through the light-sensitive element 55 is entered into the PD 52 and thus an electric signal corresponding to the incident light quantity is generated from the PD 52. The output signal from the PD 52 is amplified by the Kerr effect detecting amplifier 53 and then applied to an anomaly decision circuit 54.

As described hereinabove, when the reflected light is not subjected to the Kerr effect, a signal is applied to the anomaly decision circuit 54 so that the signal is discriminated by the anomaly decision circuit 54 and it is determined that the data has not been recorded normally on the optical disc 51. When the occurrence of the anomaly is detected in this way, the operation of a recording control circuit 19 is the same as in the case of the other embodiments described previously.

Further, the total reflected light signal from the total reflected light signal detecting amplifier 17 is also applied to the anomaly decision circuit 54. Similarly as the first embodiment, the present embodiment is also capable of determining whether the recording has been effected normally according to the total reflected light signal.

In addition, the anomaly decision circuit 54 can be so constructed that an anomaly of the recording operation is determined when a signal is applied from at least one of the total reflected light signal detecting amplifier 17 and the Kerr effect detecting amplifier 53.

With the optical disc apparatus according to the present embodiment, confirmation was made of the operation of recording a signal of a 7 MHz recording frequency at the position of a radius R=45 mm of an overwritable optical disc having a GdFeCo reproducing layer. In this apparatus, the frequency bands of the total reflected light signal detecting amplifier 17 and the Kerr effect detecting amplifier 53 were each 10 MHz. As a result, during the recording of signals on the optical disc the presence of any anomolous recorded signal was clearly detected in a real time manner so that upon the detection the head was moved to that position where the recording was to be effected anew and the recording operation was performed again, thereby eventually recording again the signal normally on the disc through the series of continuous operations.

It is to be noted that while the present embodiment is equivalent to the optical disc apparatus of the first embodiment plus the light-sensitive element 55, the PD 52 and the Kerr effect detecting amplifier 53, it is needless to say that the same results can be obtained by adding the light-sensitive element 55, the PD 52 and the Kerr effect detecting amplifier 53 to the optical disc apparatus of the second and third embodiments, respectively.

From the foregoing description it will be seen that in accordance with the present invention, when a signal has not been recorded correctly on an optical disc, this can be detected upon recording of the signal. Thus, there is no need to perform anew a reproducing operation for data checking purposes after the signal has been recorded with the result that not only any waste of additional time for this purpose can be avoided but also there is no need to provide any additional optical system for such reproducing operation.

Further, in the case of a magneto-optical disc recording apparatus capable of direct overwriting, no erasing operation is required from the outset so that the application of the present invention not only entirely eliminates the time required to perform a reproducing operation for data checking purposes after the signal recording but also absolutely eliminates the need to provide an additional optical system for such purposes, and this fact constitutes a further advantageous point.

We claim:

1. An optical disc recording apparatus comprising:
   a signal recording device for recording a signal on an optical disc by projecting a laser beam on said optical disc,
   a reflected light signal detecting circuit for receiving reflected light from said optical disc during signal recording thereon to generate a reflected light signal, and a decision circuit for detecting an irregularity of said reflected light signal to determine whether said signal has been normally recorded on said optical disc, wherein a frequency band of said reflected light signal detecting circuit is lower than a signal recording frequency.

2. An optical disc recording apparatus comprising:

a head for recording a signal on an optical disc by projecting a laser beam on said optical disc while subjecting said laser beam to intensity modulation, a photodetector for receiving reflected light of said laser beam from said optical disc to convert the reflected light into an electric signal, a signal detecting circuit for receiving the signal from said photodetector to generate a reflected light signal, and an anomaly decision circuit for receiving said reflected light signal to detect an anomaly of said reflected light signal and thereby to determine whether said signal has been normally recorded on said optical disc, wherein a frequency band of said signal detecting circuit is lower than an intensity modulation frequency of said laser beam.

3. An optical disc recording apparatus comprising:

a head for recording a signal on an optical disc by projecting a laser beam on said optical disc while subjecting said laser beam to intensity modulation, a photodetector for receiving reflected light of said laser beam from said optical disc to convert said reflected light into an electric signal, a servo signal detecting circuit for receiving the signal from said photodetector to generate a servo signal for an auto focusing control, and an anomaly decision circuit for receiving said servo signal so as to detect an anomaly of said servo signal and thereby to determine whether said recording signal has been recorded normally on said optical disc, wherein a frequency band of said servo signal detecting circuit is lower than an intensity modulation frequency of said laser beam.

4. An optical disc recording apparatus comprising:

a head for recording a recording signal on a magneto-optical disc having a GdFeCo reproducing layer and capable of direct overwriting by projecting a laser beam on said magneto-optical disc, a Kerr effect detector for detecting a Kerr effect of reflected light from said magneto-optical disc during signal recording, a photodetector for receiving the reflected light from said magneto-optical disc to convert said reflected light into an electric signal, a signal detecting circuit for receiving the electric signal from said photodetector to generate a reflected light signal, and a decision circuit responsive to an output from said Kerr effect detector and said reflected light signal to determine whether said recording signal has been recorded normally on said magneto-optical disc.

* * * * *